Figure 1:
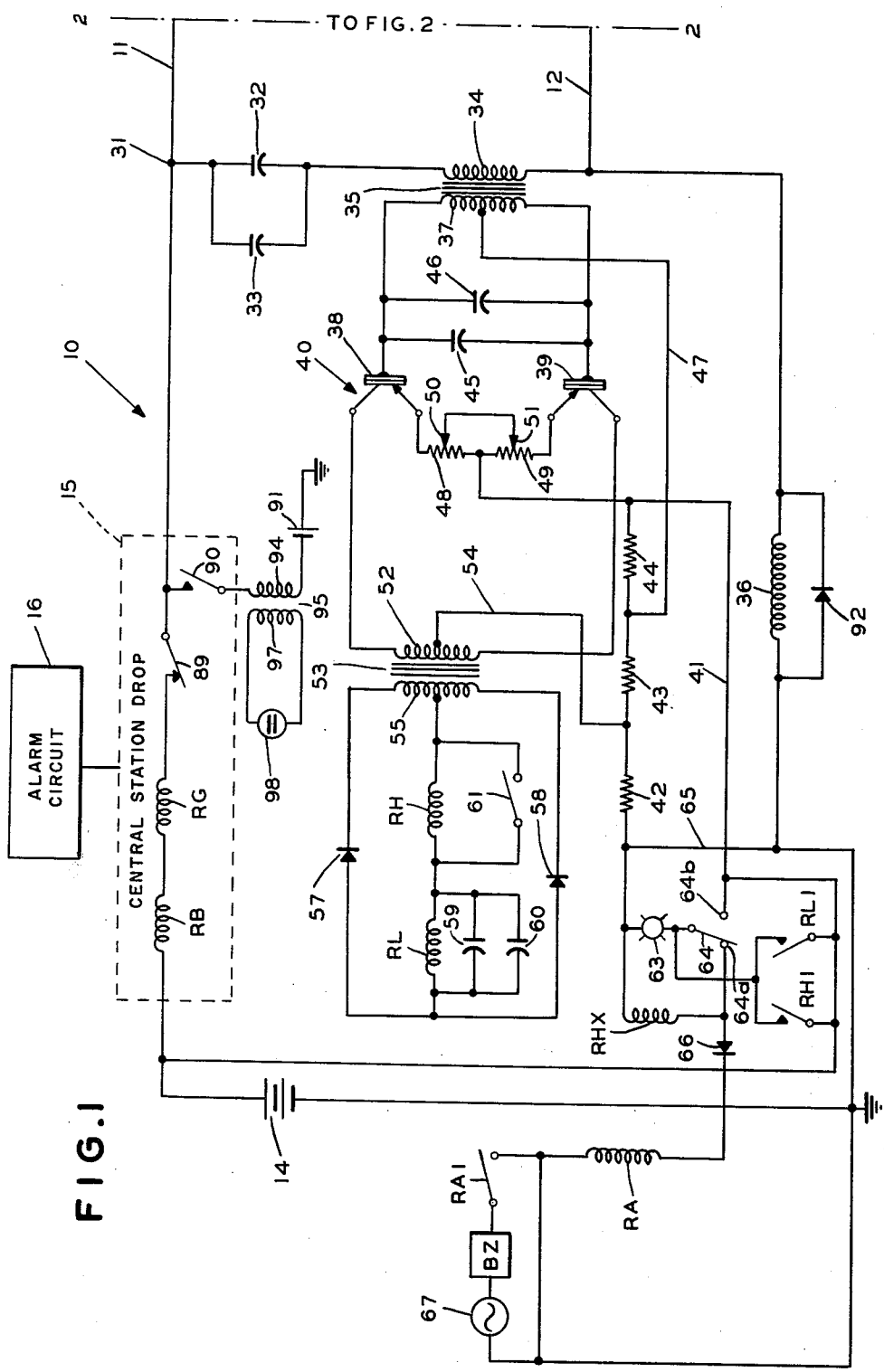

Nov. 21, 1961 M. W. MUEHTER 3,010,100
DIRECT CURRENT OPERATED BURGLAR ALARM SYSTEM
WITH ALTERNATING CURRENT SUPERVISION
Filed June 30, 1958 2 Sheets-Sheet 1

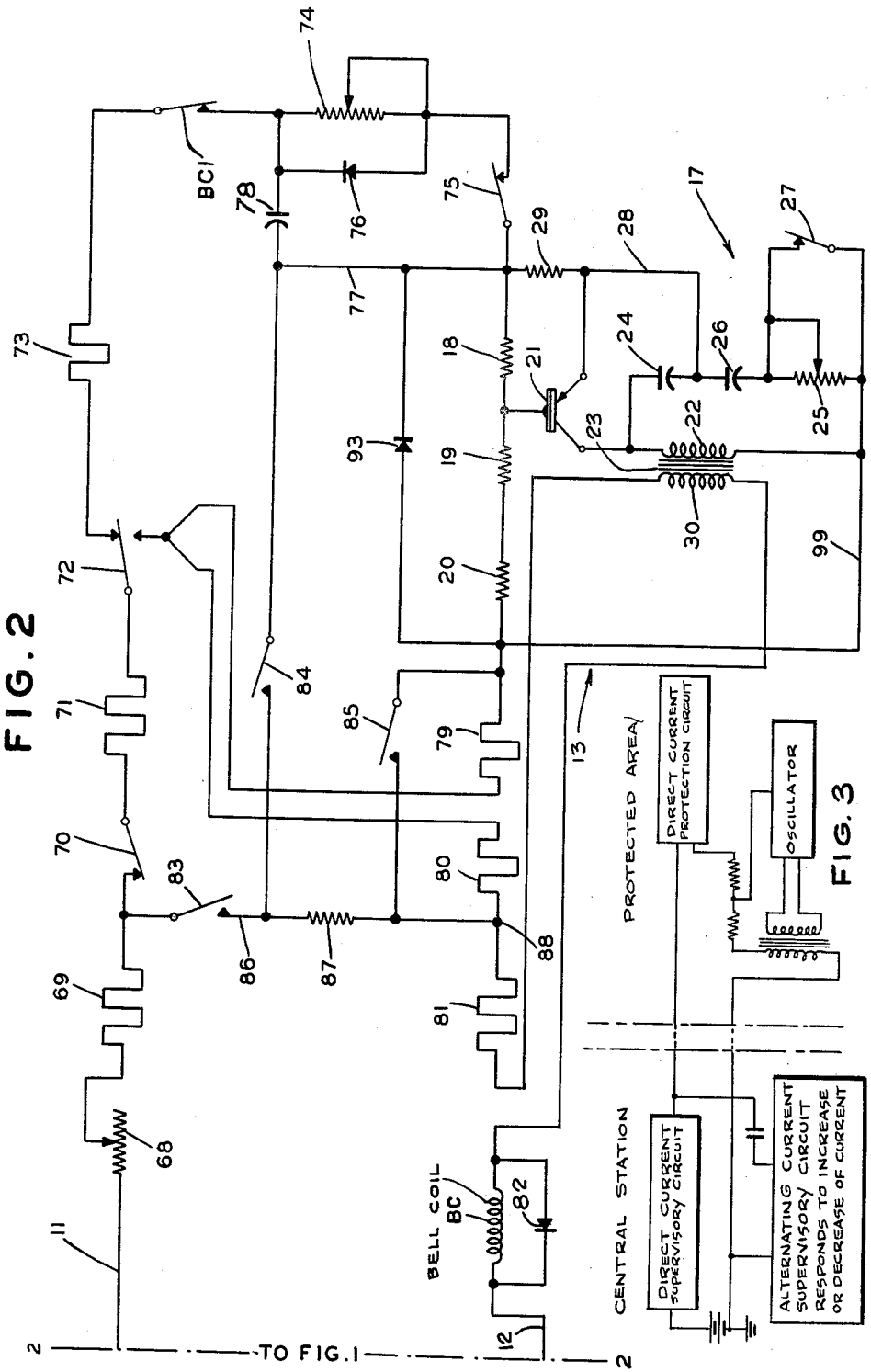

United States Patent Office 3,010,100
Patented Nov. 21, 1961

3,010,100
DIRECT CURRENT OPERATED BURGLAR ALARM SYSTEM WITH ALTERNATING CURRENT SUPERVISION
Manfred W. Muehter, Nutley, N.J., assignor to American District Telegraph Company, Jersey City, N.J., a corporation of New Jersey
Filed June 30, 1958, Ser. No. 745,719
10 Claims. (Cl. 340—276)

This invention relates to protection systems and more particularly to such systems wherein a protection circuit at a protected area is connected to a supervisory circuit at a central station having signal responsive devices associated therewith for the purpose of detecting an occurrence at the protected area.

Protection systems are customarily responsive to signals which may be represented by an increase or decrease in direct current above or below a predetermined current range. Relays or other current detecting devices are controlled by these current changes and effect the operation of various signalling devices located in an alarm circuit at the central station. Additionally, in the operation of such systems, switching means are frequently employed to remove at least a portion of the protection circuit at the protected area from the line when protection is not required. Such conditions are commonly termed "day" or "protection-off," as opposed to "night" or "protection-on."

Heretofore, particularly in the case of a burglar alarm system, it has been possible for an intruder to defeat the purpose of the system by tampering with the circuit at the protected area. Thus, for example, by bridging the transmission lines at the protected area with a device that approximates the electrical resistance of the protection circuit, an entry could be effected without causing operation of the detecting devices located at the central station. Additionally, it has occasionally been the practice of intruders to accomplish such tampering while the protection system was in its protection-off condition in preparation for a night entry, and thus, when the protection circuit is connected to the line to provide protection-on service, no signal is received at the central station and the signalling devices located therein remain quiescent during a subsequent intrusion.

One general object of this invention, therefore, is to provide an improved protection system of the type wherein a protection circuit at a protected area is connected to a supervisory circuit at a central station.

More specifically, it is an object of this invention to provide such a system wherein the possibility of undetected tampering is substantially minimized.

Another object of this invention is to provide such a system in which tampering may be readily detected whether the tampering be attempted during protection-off operation or during protection-on operation.

Still another object of the invention is to provide a new and improved protection system utilizing comparatively simple electrical components which is economical to manufacture and thoroughly reliable in operation.

In one illustrative embodiment of this invention, a protection system comprises means at the central station for detecting a change in the amount of direct current in the system, an oscillator at the protected area for generating an alternating current supervisory signal and an amplifier at the central station for receiving and amplifying the alternating current supervisory signal, together with means connected to the output of the amplifier and responsive to an increase or decrease in the amplitude of the supervisory signal.

In accordance with an important feature of this invention, the protection circuit is so designed that the alternating current supervisory signal is generated during both protection-on service and during protection-off service, thus reducing the possibility of an undetected daytime preparation for a night intrusion.

The above noted as well as further objects and features of this invention will be understood more clearly and fully from the following detailed description of a preferred embodiment thereof, when read in conjunction with the accompanying drawings, in which FIGURES 1 and 2, when joined along the lines 2—2, show a schematic wiring diagram of a preferred protection system constructed in accordance with the present invention. FIGURE 3 shows a block diagram which illustrates the circuit of FIGURES 1 and 2 in block form.

Referring now to the drawings in detail, a supervisory circuit at a central station 10 has two terminals, one of which is connected to a transmission line 11 while the other is connected to a transmission line 12. The transmission lines 11 and 12 extend between the central station 10 and a remotely located protected area 13. A source of electromotive force, such as a battery 14, is used to supply direct current in a conventional manner for the operation of the system and is connected to a central station drop indicated generally at 15. Although, for purposes of clarity, the central station drop 15 has not been illustrated in detail in the accompanying drawings, it may be of a type disclosed, for example, in my prior Patent No. 2,814,033, granted November 19, 1957, and includes a normal break relay RB and a ground relay RG. A decrease in the direct current in the transmission lines 11 and 12, such as might be occasioned by a break in these lines at the protected area 13, causes the winding of relay RB to release its armature and close a contact governed thereby (not shown) in an alarm circuit indicated diagrammatically at 16, thus operating an appropriate signalling device (not shown) and indicating that an intrusion has occurred. Similarly, an increase in the direct current in the transmission lines 11 and 12, such as would be caused by grounding these lines at the protected area, causes relay RG to close an associated contact (not shown) in the alarm circuit 16 and provides an indication of an intrusion.

There is provided at the protected area 13, representing the premises of the subscriber to the protection system, a transistor oscillator of the Colpitts type which is indicated generally by the numeral 17. The oscillator 17 is powered by means of the voltages developed across a voltage dividing network comprising series connected resistors 18, 19 and 20. Oscillator 17 includes a p-n-p junction transistor 21, the base electrode of which is connected to the common terminals of resistors 18 and 19, while the collector electrode thereof is connected to one end of the primary winding 22 of a transformer 23. The other end of winding 22 is connected to a conductor 99 which in turn is connected to one side of the resistor 20. The tank circuit of the oscillator 17 includes series connected capacitors 24 and 26. The free end of capacitor 24 is connected to the collector electrode of transistor 21, while the free end of capacitor 26 is connected to the conductor 99 through a variable resistor 25 and through manually operated day-night switch contacts 27, which are normally closed during protection-on operation. The emitter electrode of the transistor 21 is connected to a conductor 28 which extends from the common terminals of capacitors 24 and 26 to a resistor 29 which is connected to one side of the resistor 18. The oscillations developed by the oscillator 17 generate an alternating current supervisory signal of normally constant amplitude which is impressed on the main transmission lines 11 and 12 by means of a secondary winding 30 of the transformer 23, which is connected in series with transmission lines 11 and 12 as will be hereinafter described.

At the central station 10, the alternating current signal generated by the oscillator 17 is taken off the transmission lines 11 and 12 by means of a transformer 35. The primary winding 34 of transformer 35 has one terminal connected in series with a capacitor 32 which is in turn connected at 31 to transmission line 11. A trimmer capacitor 33 is connected in shunt with capacitor 32. The remaining terminal of primary winding 34 is connected to transmission line 12 and thereby to the grounded side of battery 14 through a choke coil 36.

The terminals of secondary winding 37 of transformer 35 are connected respectively to the base electrodes of p-n-p junction transistors 38 and 39 connected to provide a push-pull amplifier 40. The amplifier 40 is powered by the battery 14 through a conductor 41 and a voltage dividing network comprising resistors 42, 43 and 44 connected in series between conductor 41 and a conductor 65, the latter being connected to the ground side of battery 14. Capacitors 45 and 46 of amplifier 40 are connected in parallel across the secondary winding 37 of the transformer 35, while a conductor 47 extends between the center tap of the secondary winding 37 of transformer 35 and the junction between resistors 43 and 44. The gain of the transistor amplifier 40 may be controlled by means of series connected resistors 48 and 49 and corresponding series connected wiper contacts 50 and 51. The free ends of resistors 48 and 49 are respectively connected to the emitter electrodes of transistors 38 and 39, while the junction between resistors 48 and 49 is connected to the conductor 41. The alternating currents flowing through transistors 38 and 39 are opposite in phase and the amount of resistance between the emitters of these transistors and the wiper contacts 50 and 51 controls the negative feed-back of the amplifier 40 and thus the amplification thereof.

Connected across the collector electrodes of transistors 38 and 39 is the primary winding 52 of a load transformer 53, the center tap of which is connected through conductor 54 to the junction between resistors 42 and 43. The center tap of the secondary winding 55 of transformer 53 is connected to the winding of "high" relay RH. "Low" relay RL is connected on one side thereof in series with relay RH and on the other side thereof through parallel connected rectifiers 57 and 58 to the opposite ends of secondary winding 55. Rectifiers 57 and 58 provide full wave rectification of the current supplied by transformer 53 to relays RH and RL. Parallel connected capacitors 59 and 60 are connected in shunt with the winding of relay RL, while the winding of relay RH is shunted by means of a normally open manually operated switch 61.

Pilot lamp 63 is connected on one side to grounded conductor 65 while on its other side it is connected to the pole of a double throw switch 64 and to conductor 41 through the parallel connected contacts RH1 and RL1 of the respective relays RH and RL. Contacts RH1 of relay RH are normally open with relay RH deenergized while contacts RL1 of relay RL are normally closed when relay RL is deenergized. Wiper contacts 50 and 51 are adjusted so that the current normally supplied to relay RL is sufficient to maintain its armature attracted and contacts RL1 open as shown in FIGURE 1 of the drawings. The winding of relay RH, on the other hand, does not receive sufficient current during normal operation to close its contacts RH1.

In the drawings, the contacts governed by the various relay windings have been designated by the same letters used to identify the corresponding winding with a numerical suffix added. Additionally, the various contacts have been illustrated in their normal protection-on condition.

An auxiliary high winding RHX is connected between conductor 65 and contact 64a of switch 64. The other contact 64b of switch 64 is connected to conductor 41. Thus, when switch 64 is shifted from the position shown to close its pole against contact 64b, lamp 63 is connected across battery 14. Switch contact 64a, connected to winding RHX, is also connected through rectifier 66 to the winding of an alarm relay RA which is in turn connected to ground. Rectifier 66 provides desired isolation between other circuits connected to relay RA and buzzer BZ in common with the present circuit. The contacts RA1 of relay RA are normally open and are connected in a series circuit with buzzer BZ and an alternating current source 67. It is to be noted that winding RHX controls the same armature as winding RH though electrically independent thereof as shown. It should also be noted that switches 61 and 64 may be in the form of a double pole-double throw switch if desired.

The normal night protection circuit at the protected area 13 (FIGURE 2) may be traced from the transmission line 11 through a variable line resistor 68 to a series of detection devices of a well known type. These devices may include, for example, a fixed resistance element 69 which may be in the form of a metal foil or the like. The foil represented by element 69 may be mounted on the glass of a window or door and, as is well known, is broken when the glass is broken, thereby interrupting the flow of current in the system and actuating relay RB at the central station 10. From element 69 the protection-on circuit follows a path through manually operated "day-night" switch contacts 70 to additional detection devices such as the resistance element 71 and door contacts 72. Element 71 may be similar in construction to the fixed element 69, while door contacts 72 operate to short circuit a portion of the system and connect the transmission line 11 to grounded line 12 when a door or window is opened.

The circuit may then be traced from the door contacts 72 and an additional resistance element 73 through normally closed bell contacts BC1 of a bell coil BC to one side of a variable night resistor 74. The direct current component of the protection-on current flows through the night resistor 74 and manually operated day-night switch contacts 75 to one side of the resistor 18, while the alternating current component flows through a capacitor 78 and a conductor 77 to the resistor 18. The current path may then be traced through the series connected resistors 18, 19 and 20, a resistance element 79, the ground side of door contacts 72, an additional resistance element 80, fixed resistance element 81, the secondary winding 30 of the transformer 23 and a diode rectifier 82 to the transmission line 12 which leads to the central station 10. The transmission line 12 at the central station follows a path through the choke coil 36 to ground. The purpose of the coil 36 is to present a balanced circuit to the signal generated by oscillator 17, thereby reducing spurious signals such as cross-talk, etc.

Rectifier 82 provides a shunt around bell coil BC. Such alternating current provided by oscillator 17 as may pass through the bell coil BC is insufficient to attract the armature associated with the bell coil.

When a subscriber to the protection system desires to inactivate at least a portion of the protection devices at his location, the manually operated day-night switch contacts 27, 70 and 75 are opened and day-night switch contacts 83, 84 and 85 are closed. The direct and alternating current components then follow a path at the protected area 13 from transmission line 11, through the variable line resistor 68, the fixed protection element 69, a conductor 86 which includes switch contacts 83 and a resistor 87, to a connection 88. The protection-off current then flows from connection 88, through the fixed resistance element 81, the secondary winding 30 of transformer 23 and the rectifier 82 to the transmission line 12. In this manner the protection devices 71, 73, 79 and 80 and the door contacts 72 are rendered inoperative during protection-off service, while fixed resistance elements 69 and 81 remain in the protection circuit. Of course, if desired, resistance elements 69 and 81 may likewise be rendered inoperative during protection-off service by moving the location of conductor 86 to the left (as shown in the drawing) of the resistance elements 69 and 81. Similarly, by proper adjustment of the location of conductor 86, additional protection devices 71, 73, 79 or 80 or door contacts 72 may be included in the protection-off circuit.

The manually operated switch contacts 84 are connected between one side of resistor 87 and the conductor 77, while the manually operated switch contacts 85 are connected between the other side of resistor 87 and the common terminals of element 79 and resistor 20. Upon the closing of contacts 84 and 85, the voltage developed across the resistor 87 is placed across resistors 18, 19 and 20. Since the current in the line during protection-off service is frequently greater than the current therein during protection-on service because of the decreased electrical resistance of the system, resistor 87 may be of such value that the voltage across resistors 18, 19 and 20 and thus the current supplied to transistor 21 during protection-off service is the same as that supplied during protection-on service. Additionally, variable resistor 25, which is no longer shunted by the open switch contacts 27 during protection-off operation, may be employed for the purpose of making any necessary adjustments in the current generated by transistor 21. Thus, an alternating current signal is generated by oscillator 17 during protection-off service that normally has the same amplitude as that during protection-on service.

During normal protection-on operation of the system, the various relays and switches remain in the position shown in the drawings and no signals are received by the pilot lamp 63 or the buzzer BZ at the central station 10. Should an intruder, during protection-on service, endeavor to tamper with the system at the protected area 13 by bridging the transmission lines 11 and 12 with a device that approximates the electrical resistance of the protection circuit, the direct current component of the current in transmission lines 11 and 12 remains unchanged, and the contacts (not shown) in the alarm circuit 16 governed by relays RB and RG in the central station drop 15 remain open. Thus, there is no indication in alarm circuit 16 that tampering has occurred at the protected area 13. However, the amplitude of the alternating current component of the current in transmission lines 11 and 12 is affected, and this will cause a corresponding change in the amount of current flowing through relays RH and RL. Under certain conditions the effect of the tampering is to cut off the alternating current supervisory signal generated by oscillator 17 entirely. If the amplitude of this alternating current is reduced, relay RL deenergizes and releases its associated armature (not shown), thereby closing contacts RL1. A circuit is thus completed from the conductor 41 through contacts RL1 and the pilot lamp 63 to the conductor 65 and ground. The lamp 63 lights up and provides a visual indication that tampering has occurred. Closure of contacts RL1 also energizes the relay winding RHX through switch 64 and energizes relay RA through switch 64 and the diode rectifier 66. Energization of winding RHX causes its associated relay contacts RH1 to close to lock in the signal, and energization of relay RA closes contacts RA1 to operate the audible signal indicated by the buzzer BZ.

Switches 61 and 64 are now operated together. Closing of switch 61 shunts the winding of relay RH. Operation of switch 64 breaks the connection between switch 64 and terminal 64a and connects switch 64 to terminal 64b, thereby opening the circuits of relay winding RHX and relay RA and connecting the pilot lamp 63 directly to the conductor 41. Relay winding RHX and relay RA deenergize, and contacts RH1 and RA1 open. Contacts RA1 disconnect the buzzer BZ from the circuit. The pilot lamp 63, however, remains energized and continues to provide a visual indication that tampering has occurred at the protected area 13. After the tampering device has been removed from transmission lines 11 and 12 at the protected area 13, the alternating current component generated by the oscillator 17 returns to its designed amplitude, and relay RL reenergizes and opens contacts RL1. The reenergization of relay RL is aided by the fact that relay RH is now shunted by switch 61, thereby removing relay RH from the circuit and increasing the current flowing through relay RL. The manually operated switches 64 and 61 are then returned to the position shown in FIGURE 1. Return of switch 64 opens the circuit between the pilot lamp 63 and terminal 64b and thus extinguishes lamp 63, while the opening of switch 61 removes the short circuit from relay RH.

In the event that the tampering with the circuit at the protected area 13 causes an increase in the amplitude of the signal, as may occur when an intruder attempts to connect or substitute an alternating current signal generator across lines 11 and 12, relay RH energizes and closes its corresponding contacts RH1, thereby lighting pilot lamp 63, energizing relay winding RHX to lock in contacts RH1 and energizing relay RA to close contacts RA1 and produce an audible signal by means of the buzzer BZ, as explained above. The buzzer is silenced by operation of switches 61 and 64. Closure of switch 61 shunts relay RH, while movement of switch 64 from terminal 64a to terminal 64b opens the circuit of relay RA and relay winding RHX and connects pilot lamp 63 directly to the conductor 41. Deenergization of relay RA opens contacts RA1 and disconnects buzzer BZ, while deenergization of relay RH and winding RHX opens contacts RH1. Pilot lamp 63, however, will continue to provide a visual signal that tampering has occurred until the conditions at the central area 13 have been returned to normal and the various bridging elements or other tampering devices removed from the line. Switches 61 and 64 are then returned manually to the positions shown in FIGURE 1. Opening of switch 61 removes the short circuit from relay RH while movement of switch 64 from terminal 64b to terminal 64a extinguishes the pilot light 63.

A system has thus been provided for detecting tampering at the protected area 13 which provides a signal at the central station 10 which is in addition to the normal intrusion indicating signals in the alarm circuit 16. By proper adjustment of relays RL and RH and wiper contacts 50 and 51, contacts RH1 will close only upon an increase in the alternating current signal generated by oscillator 17 above a predetermined upper limit, while contacts RL1 will close only upon a decrease in this signal below a predetermined lower limit. In this manner, slight variations in the tone signal will not create an unwanted alarm at the central station 10.

Should an intruder endeavor to tamper with the protection circuit at the protected area 13 during protection-off service, such as by bridging transmission lines 11 and 12 with a device having an electrical resistance that approximates the resistance of the protection circuit, the amplitude of the alternating current signal generated by oscillator 17 will be affected, and the pilot lamp 63 and the buzzer BZ at the central station 10 will provide an indication that tampering has occurred in a manner described heretofore.

In order to insure that the circuit at the protected area 13 is functioning properly, a manually controlled test switch 89 in the central station drop 15 is opened and test switch 90 is closed. Operation of these switches places a reverse test current on the line from the negative side of a battery 91, the positive side of this battery being connected to ground. The test is accomplished while the protection system is in its night or protection-on condition. The test current follows a path from the grounded transmission line 12 through a rectifier 92 which is placed in shunt with the choke coil 36 to bell coil BC at the protected area 13. The test current then flows from coil BC through the secondary winding 30 of the transformer 23, protection devices 81 and 80, the ground side of door contacts 72, the additional protection device 79, and a diode rectifier 93 which is placed in shunt with the resistors 18, 19 and 20. The oscillator 17 is thus protected from damage due to the reverse potential applied during the test period. Test current then follows a path through a portion of conductor 77, day-night switch contacts 75, a rectifier 76 which is placed in shunt with the night resistor 74, bell contacts BC1, protection device 73 and door contacts 72, protection device 71, day-night switch contacts 70, fixed resistance element 69, the variable line resistor 68 and along the transmission line 11 to the central station 10 and the central station drop 15. This current returns to battery 91 through the closed switch 90 and the primary winding 94 of a test transformer 95.

If the circuit at the protected area 13 is functioning properly, current through the bell coil BC causes its associated bell contacts BC1 to produce a series of successive current interruptions in the circuit. The armature of bell coil BC in its operation of its bell provides an indication at the protected area 13 that the system is in working order. The current induced in a secondary winding 97 of the transformer 95 is successively interrupted due to the operation of the bell contacts BC1, causing a neon lamp 98 connected across winding 97 to provide a visual signal that the system is functioning properly. Thus, by means of the bell at the protected area 13 and the neon lamp 98 at the central station 10, it is possible to ascertain at each of these locations whether the system is in proper working order. Since the rectifier 93 operates to shunt oscillator 17 during the test period, the amplitude of the signal generated thereby decreases and causes relay contacts RL1 at the central station 10 to close and thus energize lamp 63 and buzzer BZ, thereby providing additional test signals at the central station 10.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. In an electrical protection system, a protection circuit at a protected area normally having a predetermined resistance, a direct current supervisory circuit at a central station, a transmission line connecting said protection circuit to said direct current supervisory circuit, said direct current supervisory circuit including means for supplying direct current over said transmission line to said protection circuit and including means for detecting a change in said direct current, alternating current means for supervising the condition of said protection circuit and said transmission line and for providing a signal when the same are tampered with so as to render at least a part thereof ineffective to transmit a direct current alarm signal and comprising means at said protected area for generating an alternating current signal and for supplying the same over said transmission line to said central station, and an alternating current supervisory circuit connected to said transmission line at said central station including first and second detecting means, said first detecting means responsive to an increase in said alternating current signal and said second detecting means responsive to a decrease in said alternating current signal.

2. In an electrical protection system, a protection circuit at a protected area normally having a predetermined resistance, a direct current supervisory circuit at a central station, a transmission line connecting said protection circuit to said direct current supervisory circuit, said direct current supervisory circuit including means for supplying direct current over said transmission line to said protection circuit and including means for detecting a change in said direct current, alternating current means for supervising the condition of said protection circuit and said transmission line and for providing a signal when the same are tampered with so as to render at least a part thereof ineffective to transmit a direct current alarm signal and comprising oscillating means at said protected area for generating an alternating current signal and for supplying the same over said transmission line to said central station, and an alternating current supervisory circuit connected to said transmission line at said central station including first and second detecting means, said first detecting means responsive to an increase in said alternating current signal above a predetermined upper value and said second detecting means responsive to a decrease in said alternating current signal below a predetermined lower value.

3. In an electrical protection system, a protection circuit at a protected area normally having a predetermined resistance, a direct current supervisory circuit at a central station, a transmission line connecting said protection circuit to said direct current supervisory circuit, said direct current supervisory circuit including means for supplying direct current over said transmission line to said protection circuit and including means for detecting a change in said direct current, alternating current means for supervising the condition of said protection circuit and said transmission line and for providing a signal when the same are tampered with so as to render at least a part thereof ineffective to transmit a direct current alarm signal and comprising oscillating means at said protected area for generating an alternating current signal and for supplying the same over said transmission line to said central station, and an alternating current supervisory circuit connected to said transmission line at said central station including an amplifier for amplifying said alternating current signal and including first and second detecting means, said first detecting means connected to the output of said amplifier and responsive to an increase in said alternating current signal above a predetermined upper value and said second detecting means connected in series with said first detecting means and responsive to a decrease in said alternating current signal below a predetermined lower value.

4. In an elecrical protection system, a protection circuit at a protected area normally having a predetermined resistance, a direct current supervisory circuit at a central station, a transmission line connecting said protection circuit to said direct current supervisory circuit, said direct current supervisory circuit including means for supplying direct current over said transmission line to said protection circuit and including means for detecting a change in said direct current, alternating current means for supervising the condition of said protection circuit and said transmission line and for providing a signal when the same are tampered with so as to render at least a part thereof ineffective to transmit a direct current alarm signal and comprising oscillating means at said protected area operable by said direct current for generating an alternating current signal and for supplying the same over said transmission line to said central station, and an alternating current supervisory circuit connected to said transmission line at said central station including first and second detecting means, said first detecting means responsive to an increase in said alternating current signal above a predetermined upper value and said second detecting means responsive to a decrease in said alternating current signal below a predetermined lower value.

5. In an electrical protection system, a protection circuit at a protected area normally having a predetermined resistance, a direct current supervisory circuit at a central station, a transmission line connecting said protection circuit to said direct current supervisory circuit, said direct current supervisory circuit including means for supplying direct current over said transmission line to said protection circuit and including means for detecting a change in said direct current, switching means at said protected area for connecting said direct current supervisory circuit in series with said protection circuit to provide protection-on service and for connecting said direct current supervisory circuit to ground to provide protection-off service, alternating current means for supervising the condition of said protection circuit and said transmission line and for providing a signal when the same are tampered with so as to render at least a part thereof ineffective to transmit a direct current alarm signal and comprising oscillating means at said protected area for generating an alternating current signal and for supplying the same over said transmission line to said central station during protection-on service and during protection-off service, and an alternating current supervisory circuit connected to said transmission line at said central station including an amplifier for amplifying said alternating current signal and including first and second detecting means, said first detecting means connected to the output of said amplifier and responsive to an increase in said alternating current signal above a predetermined upper value and said second detecting means connected in series with said first detecting means and responsive to a decrease in said alternating current signal below a predetermined lower value.

6. In an electrical protection system, a protection circuit at a protected area normally having a predetermined resistance, a direct current supervisory circuit at a central station, a transmission line connecting said protection circuit to said direct current supervisory circuit, said direct current supervisory circuit including means for supplying direct current over said transmission line to said protection circuit and including relay means for detecting a change in said direct current, switching means at said protected area for connecting said direct current supervisory circuit in series with said protection circuit to provide protection-on service and for connecting said direct current supervisory circuit to ground to provide protection-off service, alternating current means for supervising the condition of said protection circuit and said transmission line and for providing a signal when the same are tampered with so as to render at least a part thereof ineffective to transmit a direct current alarm signal and comprising oscillating means at said protected area operable by said direct current for generating an alternating current signal and for supplying the same over said transmission line to said central station during protection-on service and during protection-off service, and an alternating current supervisory circuit connected to said transmission line at said central station including an amplifier for amplifying said alternating current signal and including first and second detecting means, said first detecting means connected to the ouput of said amplifier and responsive to an increase in said alternating current signal above a predetermined upper value and said second detecting means connected in series with said first detecting means and responsive to a decrease in said alternating current signal below a predetermined lower value.

7. In an electrical protection system, a protection circuit at a protected area normally having a predetermined resistance, a direct current supervisory circuit at a central station, a transmission line connecting said protection circuit to said direct current supervisory circuit, said direct current supervisory circuit including means for supplying direct current over said transmission line to said protection circuit and including relay means for detecting a change in said direct current, switching means at said protected area for connecting said direct current supervisory circuit in series with said protection circuit to provide protection-on service and for connecting said direct current supervisory circuit to ground to provide protection-off service, alternating current means for supervising the condition of said protection circuit and said transmission line and for providing a signal when the same are tampered with so as to render at least a part thereof ineffective to transmit a direct current alarm signal and comprising oscillating means at said protected area operable by said direct current for generating an alternating current signal and for supplying the same over said transmission line to said central station during protection-on service and during protection-off service, an alternating current supervisory circuit connected to said transmission line at said central station including an amplifier for amplifying said alternating current signal and including first and second detecting means, said first detecting means connected to the output of said amplifier and responsive to an increase in said alternating current signal above a predetermined upper value and said second detecting means connected in series with said first detecting means and responsive to a decrease in said alternating current signal below a predetermined lower value, reverse current means at said central station for testing the condition of said system, and means responsive to said reverse current means for providing an indication of the condition of said system.

8. In an electrical protection system, a protection circuit at a protected area normally having a predetermined resistance, a direct current supervisory circuit at a central station, a transmission line connecting said protection circuit to said direct current supervisory circuit, said direct current supervisory circuit including means for supplying direct current over said transmission line to said protection circuit and including first and second relay means, said first relay means responsive to an increase in said direct current and said second relay means responsive to a decrease in said direct current, switching means at said protected area for connecting said direct current supervisory circuit in series with said protection circuit to provide protection-on service and for connecting said direct current supervisory circuit to ground to provide protection-off service, alternating current means for supervising the condition of said protection circuit and said transmission line and for providing a signal when the same are tampered with so as to render at least a part thereof ineffective to transmit a direct current alarm signal and comprising an oscillator operable by said direct current and having the output thereof connected in series with said protection circuit for generating an alternating current signal and for supplying the same over said transmission line to said central station during protection-on service and during protection-off service, and an alternating current supervisory circuit connected to said transmission line at said central station including an amplifier for amplifying said alternating current signal and including first and second relays, said first relay connected to the output of said amplifier and responsive to an increase in said alternating current signal above a predetermined upper value and said second relay connected in series with said first relay and responsive to a decrease in said alternating current signal below a predetermined lower value, said alternating current supervisory circuit including means for indicating the condition of said first and second relays.

9. In an electrical protection system, a protection circuit at a protected area normally having a predetermined resistance, a direct current supervisory circuit at a central station, a transmission line connecting said protection circuit to said direct current supervisory circuit, said direct current supervisory circuit including means for supplying direct current over said transmission line to said protection circuit and including first and second relay means connected in series with each other, said first relay means responsive to an increase in said direct current and said second relay means responsive to a decrease in said direct current, switching means at said protected area for connecting said direct current supervisory circuit in series with said protection circuit to provide protection-on service and for connecting said direct current supervisory circuit to ground to provide protection-off service, alternating current means for supervising the condition of said protection circuit and said transmission line and for providing a signal when the same are tampered with so as to render at least a part thereof ineffective to transmit a direct current alarm signal and comprising a transistor oscillator operable by said direct current and having the output thereof connected in series with said protection circuit for generating an alternating current signal and for supplying the same over said transmission line to said central station during protection-on service and during protection-off service, an alternating current supervisory circuit connected to said transmission line at said central station including a transistor amplifier for amplifying said alternating current signal and including first and second relays, said first relay connected to the output of said amplifier and responsive to an increase in said alternating current signal above a predetermined upper value and said second relay connected in series with said first relay and responsive to a decrease in said alternating current signal below a predetermined lower value, said alternating current supervisory circuit including means for indicating the condition of said first and second relays, reverse current means at said central station for testing the condition of said system, and means responsive to said reverse current means and including said condition indicating means for providing an indication at said central station and at said protected area of the condition of said system.

10. In an electrical protection system, a protection circuit at a protected area normally having a predetermined resistance, a direct current supervisory circuit at a central station, a transmission line connecting said protection circuit to said direct current supervisory circuit, said direct current supervisory circuit including means for supplying direct current over said transmission line to said protection circuit and including first and second relay means connected in series with each other, said first relay means responsive to an increase in said direct current and said second relay means responsive to a decrease in said direct current, switching means at said protected area for connecting said direct current supervisory circuit in series with said protection circuit to provide protection-on service and for connecting said direct current supervisory circuit to ground to provide protection-off service, alternating current means for supervising the condition of said protection circuit and said transmission line and for providing a signal when the same are tampered with so as to render at least a part thereof ineffective to transmit a direct current alarm signal and comprising a transistor oscillator operable by said direct current and having the output thereof connected in series with said protection circuit for generating an alternating current signal of normally constant amplitude and for supplying the same over said transmission line to said central station during protection-on service and during protection-off service, an alternating current supervisory circuit connected to said transmission line at said central station including a transistor amplifier connected in push-pull relation for amplifying said alternating current signal and including first and second relays, said first relay connected to the output of said amplifier and responsive to an increase in said alternating current signal above a predetermined upper value and said second relay connected in series with said first relay and responsive to a decrease in said alternating current signal below a predetermined lower value, said alternating current supervisory circuit including audible and visual means for indicating the condition of said first and second relays, reverse current means at said central station for testing the condition of said system, and means responsive to said reverse current means and including said condition indicating means for providing an indication at said central station and at said protected area of the condtion of said system.

References Cited in the file of this patent

UNITED STATES PATENTS

| | | |
|---|---|---|
| 1,632,059 | Curtis | June 14, 1927 |
| 2,670,466 | Harper | Feb. 23, 1954 |
| 2,814,033 | Muehter | Nov. 19, 1957 |